Figure 1:
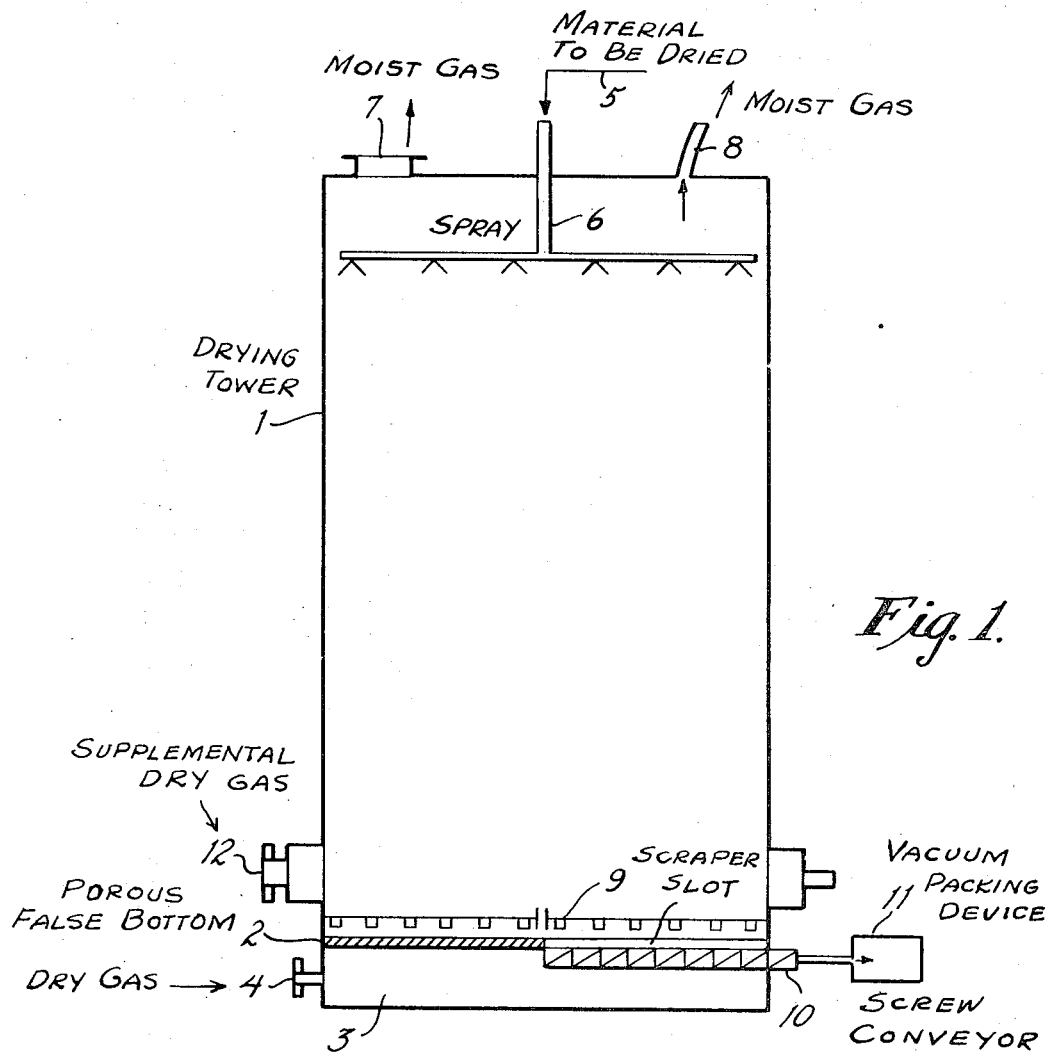

United States Patent

[11] 3,547,179

[72] Inventor Peter Hussmann
  Florence, Italy
[21] Appl. No. 719,287
[22] Filed Mar. 11, 1968
  Division of Ser. No. 511,650, filed Dec. 6, 1965, Pat. No. 3,415,665, which is a continuation of Ser. No. 735,299, May 14, 1958, abandoned, which is a continuation of Ser. No. 785,795, Jan. 9, 1959, abandoned, which is a continuation of Ser. No. 87,808, Feb. 8, 1961, abandoned.
[45] Patented Dec. 15, 1970
[73] Assignee By mesne assignments, to Uta-Patentverwaltungsgesellschaft mbH, Munich, Germany

[54] APPARATUS FOR MANUFACTURE OF HEAT-SENSITIVE PRODUCTS
  5 Claims, 7 Drawing Figs.
[52] U.S. Cl. ................................................. 159/4
[51] Int. Cl. ................................................. B01d 1/18
[50] Field of Search .................................. 159/4A, 4B, 4C, 4CC, 4E, 48, F.B.

[56] References Cited
UNITED STATES PATENTS
1,782,822  11/1930  Hechenbleikner ............ 159/4A
2,110,167  3/1938   Northcutt et al. ............ 159/4C
3,266,556  8/1966   Malek ........................... 159/16

FOREIGN PATENTS
100,936    8/1923   Switzerland .................. 159/4B
584,485    10/1959  Canada ......................... 159/FB
982,625    6/1951   France .......................... 159/4C
1,006,420  4/1952   France .......................... 159/4A OTHER REFERENCES
"Atomization & Spray Drying" by W. R. Marshall, Jr. Chem. Engg Progress Monograph Series No. 2 Vol. 50, 1954. Published by the American Institute of Chemical Engineers 25 W. 45 St. N.Y. 36, N.Y. p. 114 159-4

Primary Examiner—Norman Yudkoff
Assistant Examiner—J. Sofer
Attorneys—Gerard J. Weiser, Charles A. McClure, Alfred Stapler and Erich M. H. Radde ABSTRACT: A tower for converting a wet material into a dry powder having a spray beneath its upper wall to deliver the liquid material into the tower for descent therein, a false porous bottom above the regular bottom wall, means to admit dehumidifying gas in the space between the porous false and regular bottom walls for ascent through the porous false bottom countercurrent to the descent of the wet material, means to vent the moisture-laden gas from the top of the tower, and means to remove the dried powder from beneath the false bottom including a plurality of cascading interconnected fluidized bed afterdriers arranged beneath the porous false bottom, the latter having an overflow pipe discharging into the uppermost afterdrier, the dehumidifying gas passing upwardly through the afterdriers.

INVENTOR
PETER HUSSMANN
ATTORNEY

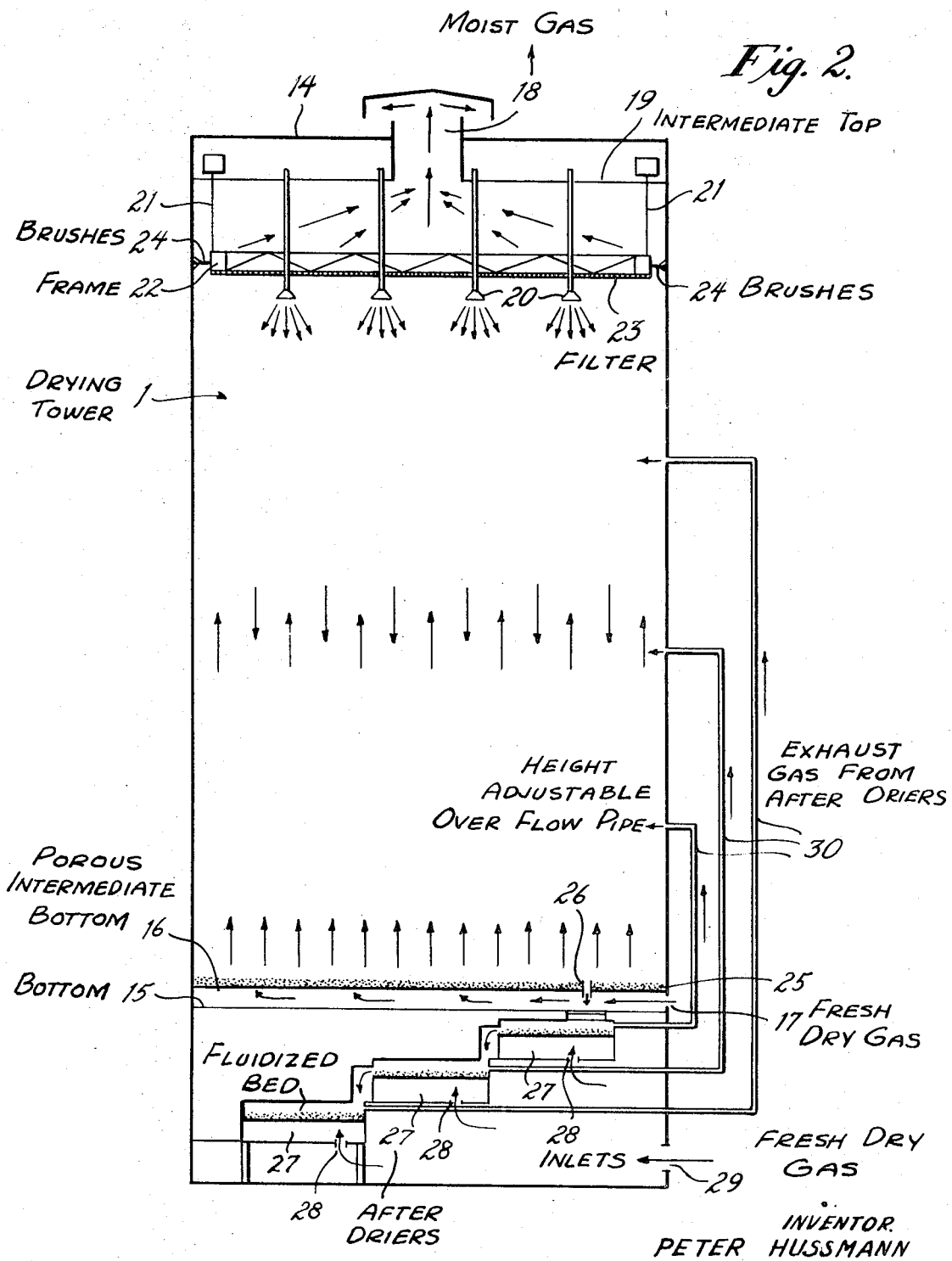

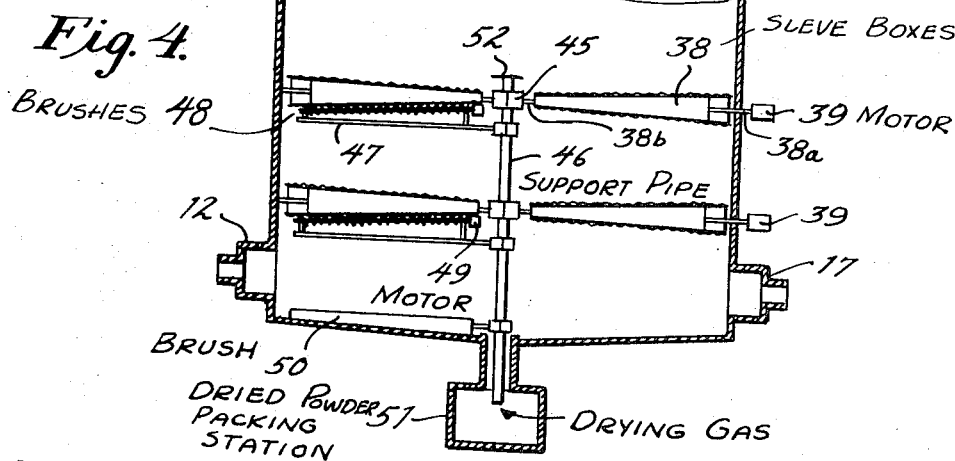
Fig. 4.
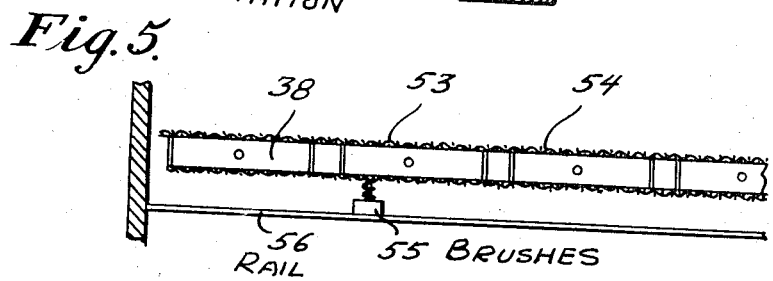
Fig. 5.
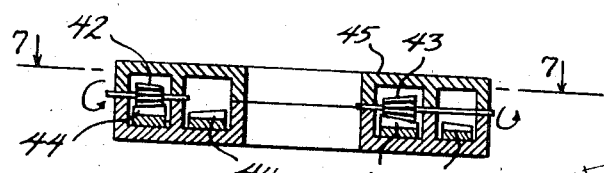
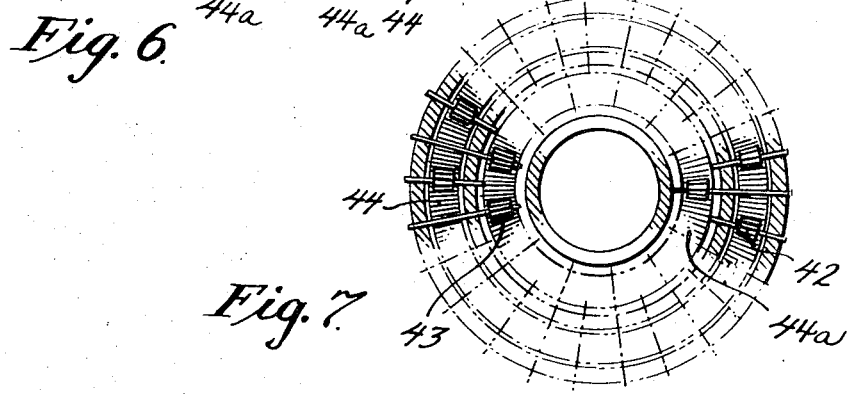
Fig. 6.
Fig. 7.
INVENTOR.
PETER HUSSMANN

APPARATUS FOR MANUFACTURE OF HEAT-SENSITIVE PRODUCTS

The present application is a division of Ser. No. 511,650 filed Dec. 6, 1965 and now U.S. Pat. No. 3,415,665 which is in turn a continuation-in-part of applications Ser. No. 735,299, filed May 14, 1958, and entitled DEHYDRATION PROCESS AND APPARATUS THEREFOR, Ser. No. 785,795, filed Jan. 9,1959, and entitled PROCESS OF PRODUCING DEHYDRATED EDIBLE FAT PREPARATIONS OF EXCELLENT STORABILITY AND PRODUCTS, and copending application Ser. No. 87,808, filed Feb. 8, 1961, entitled DEHYDRATION PROCESS, PRODUCTS OBTAINED THEREBY, AND APPARATUS FOR CARRYING OUT SAID PROCESS now abandoned.

This invention more specifically relates to a dehydration process for removing water by evaporation from liquid-carrying solids in solution or suspension, and more particularly to a novel method of producing stable dehydrated, reconstitutable food products intended for human consumption and dehydrated delicate chemicals, and to products produced thereby.

The invention is especially applicable to the evaporation of water from heat-sensitive materials, particularly food substances, and to the preparation of dried products which may be reconstituted by subsequently mixing them with water, with the preservation in such products of those qualities in the dehydrated product which, when the product is reconstituted, exhibit the flavor and aroma and color of the original material. Although especially useful in the preparation of food products, the invention is also applicable for the processing of various heat-sensitive substances, especially organic substances, chemical and biochemical substances, plasma, serums, yeasts, etc.

The invention provides a new product characterized by a combination of unique and advantageous properties. The product shows remarkably rapid solubilization or dispersion in liquids, splendid retention of the desirable properties such as aroma, flavor, nutrients originally present in the material and excellent storage stability. The product is characterized by unique physical characteristics described further hereinafter. The invention further provides a novel process for making these products which is unexpected departure and contrary to conventional processes prevailing in the field of treatment of heat-sensitive materials. In numerous of its essential aspects, the process of the invention goes against the principles and methods taught by the prior art. The process of the invention, as described further below, calls for a number of interrelated conditions which all interact to bring about certain products, which are not only dehydrated, but which have in accordance with the invention a combination of desirable and unexpected properties.

Various known processes have numerous shortcomings and do not yield satisfactory products. In another attempt to minimize the adverse effects of heat drying, a known process provides for means for cooling particles which have been dried to exposure to hot air by subjecting the dried particles to cooler air in a lower zone to which the particles fall. However, even in such a process, the irreversible adverse effect of the hot air drying the particles has already taken place.

It has been established as a rule that for heat-sensitive materials of all types (and for many foodstuffs heat sensitiveness commences at a temperature as low as 35° C.) the concept of countercurrent spray drying is unworkable and impractical. For reasons of equipment efficiency as well as for economic reasons, temperatures ranging from 100° to 160° C. must be employed, and therefore it is quite obvious that an incoming air at this temperature will destroy or completely burn the product in only fractions of seconds. Even when the drying air is fed at a temperature of 50° C. the air damages the dry powder since in all known countercurrent drying processes the dispersed droplets explode when contacting the low saturated drying gas and then shrink into a flattened skin which later on, during the course of the dehydration, agglomerates into the conventional type of particle having an exterior crust of skin and inner cavities closed to the exterior.

It is an object of the present invention to provide a process for dehydrating delicate natural products and delicate chemicals whereby much if not substantially all of the inherent characteristics of the original material will remain preserved in the dehydrated product.

Another object of the present invention is to provide a process for dehydrating delicate natural products, such as foodstuffs, without damaging or losing any appreciable amount of their desirable characteristics, such as flavor and aroma.

A further object of the present invention is to provide a process of concentrating and dehydrating emulsified edible fats and especially emulsified edible fats made from milk, cream, sweet and acid whey, vegetable fats emulsified with whole milk or skimmed milk or other materials, and the like and to produce preparations that are stable and can be stored without any substantial change in their properties for a prolonged period of time.

Another object of the present invention is to provide substantially anhydrous emulsified edible fats, and more particularly emulsified fats made from milk, cream, sweet and acid whey, vegetable fats emulsified with whole milk or skimmed milk or other materials, and the like, which dehydrated products are stable and can be stored for a prolonged period of time, whereby substantially all the inherent characteristics will remain in unchanged form in the dehydrated products.

Another object of the present invention is to provide stable, substantially dehydrated natural products and delicate chemicals or mixtures thereof which products are readily reconstituted by the addition of water to their original state without any appreciable change in flavor and aroma as well as other properties.

Other objects and advantages of the present invention will become readily apparent as the description thereof proceeds.

The novel dehydrated products of the invention have a combination of novel and unique advantageous characteristics. The dehydrated particles obtained by the dehydration process according to the present invention, when magnified, present a wrinkled and shriveled appearance which may be designated as "porcupinelike" or "hedgehoglike" appearance. The exposed surface areas of said particles are extensive in proportion to the surfaces of generally smooth surface particles of about the same diameter and are very considerably larger than the surface areas of particles obtained according to conventional spray drying. These are of a spheroidal form with vapor holes through the particle shell; they have a relatively smooth surface and body with a mass of fine and larger vapor holes through the particle shell and body.

In contrast, the particles of the products of the invention evidence a new type of a porous structure. The product comprises fully spherical granules with holes reaching deeply into the interior of the spheres. The particle does not evidence an outer skin, and it is free of an outer crust. Further, the particle is essentially free of cavities, or holes, that are closed to the exterior. As a result, the particles are free of air traps, or of such traps for other gases. The holes or crevices of openings of the particles are open to the exterior and thus connected with the exterior surfaces of the particles. The powder of particles of the invention has all the properties of the solid contained in the starting material which may be an aqueous dispersion, suspension or solution of solids. The powder is not denatured and, in the case of food products, it shows no change of taste as a result of the process of the invention.

The products of the invention have remarkably improved storability, in particular when they are packed under vacuum. The gases which normally influence the stability of the powder products can thereby be completely extracted from the particles of the powder. Moreover, the powders of the invention may be considered as "instant" powder or product because the powder will essentially instantly dissolve without leaving any significant residue, even in cold water. If the powder is of a colloidal soluble material, or, if it is a nonsoluble material but dispersible it is instantly dispersed or wetted while swelling. The dehydrated products according to the present invention are especially rapidly reconstitutable with water, i.e., their "instant" character is superior to that of products as they are obtained by conventional spray drying. For instance, whole milk powder is readily dispersed in water within 1 second to 10 seconds while commercial whole mild powder requires at least 2 minutes to achieve complete dispersion. The rapid dispersibility of the new products is apparently due to their considerable larger porous structure, the stability of the $\alpha$-lactose (minimum conversion to $\beta$-lactose) and the nondenaturation of the protein. The whole powder is 100 percent soluble. The difference in structure and appearance under the microscope of dehydrated particles obtained according to the present invention in comparison to particles dehydrated by the conventional spray drying process, apparently results from the difference in the drying process and is evidence of the careful, slow water evaporation which, as described above, did not destroy the cohesive and adhesive forces so that the flavoring and aromatic constituents were retained.

In order to attain the desired objects, the dehydration process of the invention is carried out under certain specified conditions.

It has now been discovered that in order to obtain the desired structure in the dehydrated product it is necessary that the treatment of the material, during the first part of the dehydration, be extended or continued beyond the time necessary for dehydrating the product to the desired degree of water content until there is formed a corn or grain from the dispersed droplets. It is an important aspect of the invention that the residence time of the material to be dehydrated in the drying zone, under the conditions further described below, exceeds the time necessary for obtaining a product of the desired residual humidity. Thus the contact time of the material to be dehydrated with the specified conditions exceeds that required for the degree of dehumidification. Moreover, in accordance with the process, it is necessary that in the first zone of the dehydration, there be maintained an atmosphere of such high humidity that the dispersed droplets do not, as it is customary, explode during the dehydration and then shrink into a flattened skin which later on, during the course of the dehydration, agglomerates into the conventional type of particle having an exterior crust of skin and inner cavities closed to the exterior. In the first stage of the dehydration process, the dispersed droplets are subjected to such a limited dehydration in an atmosphere of highly humid gases of relatively low temperatures that the droplet of the material being treated forms itself without exploding into a porous corn, free of crusty skin. Moreover, in accordance with the process, in this first stage, the volatile substances that may have been extracted into the drying gas from a preceding particle that was dried are then in turn extracted, transferred or washed out from the humid atmosphere into another particle to be dried.

Accordingly, for these two reasons the contact time, or treatment period of the products with the moving countercurrent dehydrating gas, must be prolonged beyond the time necessary for the drying of the products to the extent desired. In this manner, in the upper stage of the drying zone, in the area of the highly saturated humid gases, the product of new structure can be formed and, as a second reason, to provide a so-called washing zone in which the volatile materials which have been extracted from the materials in the lower zone are again absorbed in the materials. Thus, there prevail two main zones: an upper zone, the absorption zone and a lower zone, the absorption zone. In order to form these effective zones, it is necessary to carry out the process of the invention with a slowly moving countercurrent of drying gas in a drying zone, or tower, of certain unusual height under the conditions specified.

It is an important aspect of the process that a certain relationship be maintained between the material to be treated and the drying gas, its humidity when fed into the drying zone, that at point of exit and its upward velocity in the zone. In accordance with the process of the invention the liquid-starting material is dispersed into a countercurrent of gas, in determinable droplet size, at an inlet feed velocity in such a way that, preferably, the diameter of the drying tower is essentially constantly covered with a dense layer of the dispersed starting material. Accordingly, the starting material is sprayed into the tower in such a way as to form a dense screen of falling particles. In this manner, the escape of dust from dried material is substantially eliminated and the humidity-saturated air is brought into intimate contact with the dense rain of drops which reabsorbs vapors and aroma carried in the updraft of air. Accordingly, there prevails within the tower a column of falling drops initially falling in a dense rain into the entire area immediately below the spray device, their distribution becoming increasingly heterogeneous as the drops encounter the moving current of air or gas, and decreasing in weight as the evaporation progresses. The gradual and progressive decrease in weight is another characteristic of the process of the invention. It promotes the retention of the integrity (physical and biochemical) of the product. It is another aspect of the process of the invention that a predried, gas-forming drying material which has a low humidity is fed into the bottom of the tower. The drying gas has a low degree of humidity and is of moderate low temperatures; it has a regulatable inlet feeding velocity. In this manner, the drop height of the material treated, and thereby the height of the tower, can so be determined and related to the upwardly moving velocity of the drying gas. Thus, the material and the gas are maintained in contact until, at the top portion of the tower, the exiting gas has a humidity between about 65 percent and 95 percent of saturation. Under such conditions, the material reaches the bottom of the tower already in a cornlike form, in which it is then removed from the tower.

The spraying device or nozzle system for forming the droplets is preferably mounted in the tower at some distance from its top. A distance of 2 to meters to 10 meters is preferably selected. Numerous tests have shown that a distance of 3 meters to 5 meters from the top of the tower is particularly advantageous in a tower of the diameter and height used in the process. By having the spray nozzles below the top of the tower, space is provided above the nozzles for the air that does not contact the product to mix with the moist air so that the drops initially contact only moist air. The velocity with which the droplets leave the nozzles is between about 0.1 m./second and about 3.0 m./second and preferably lower than 2 m./second. Beyond the practical aspect, the initial low velocity with which the droplet is fed into the highly humid atmosphere contributes to minimizing the development of electrical charges on the droplet and its deleterious effects on the product.

Feeding of the material into the tower is performed with such means adopted to disperse the material to be dried into a substantially similar droplet size. There can be used, for instance, dual-material delivery nozzles or cuplike sprays. However, any nozzles that produce a rain of drops or droplets of a generally uniform average selected size with low friction may be employed. Fundamentally, the process of the invention is independent of the droplet size of the material to be dried. However, it is highly desirable for each particular material to select an optimum drop size within certain determined limits and ranges. Advisably, the drop sizes for various materials are selected so that they are delivered in the sizes as shown in the table. However, it has been found in accordance with the invention that it is highly desirable that the lower limits of the drop size be maintained at about 50 microns since at sizes below that there occurs a denaturization of the material as a result of the electrostatic charges which adversely affect the nature and the quality of the product. As a rule, the particle size should not be below 200 microns. It is only in a few exceptional cases like butter or margarine that it may or should be lower. To promote instant solubility, particle size should normally not be below 400 to 500 microns. Particle sizes up to 2,000 microns are possible. The particle size of the droplets as given hereinbefore in microns indicates the average diameter size of the droplets. In general, about 60 to 70 percent of all droplets have a particle size within the range given in the table while about 15 percent to 20 percent consist of droplets of a smaller particle size and about 15 percent to 20 percent of larger droplets.

In this context it must be emphasized that in accordance with the invention the fracturing of the droplets is minimized. Most complete uniform distribution of the droplets within the drying tower, with the range of particle size of the droplets being as uniform as possible, is highly desirable.

The following table reports the average drop size in which typical materials are fed into the drying zone and treated in accordance with the invention.

TABLE

| Material treated | Average drop size in microns |
| --- | --- |
| Condensed milk with 35% milk constituents | 500–600 |
| Drinking chocolate | 200–300 |
| Grape juice | 500–700 |
| Pineapple juice | 400–500 |
| Apple sauce | 500–700 |
| Banana puree with 20% solid constituents | 400–600 |
| Potato puree with 18% solid constituents | 300–600 |
| Tomato puree with 28% solid constituents | 600–800 |
| Oxtail soup | 700–900 |
| Vegetable soup | 500–600 |
| Pineapple jam | 600–700 |
| Strawberry jam | 600–700 |
| Apple jelly | 300–500 |
| Chocolate pudding | 300–500 |
| Egg | 400–600 |
| Coffee | 400–500 |
| Tea | 300–400 |
| Fish puree with 16% solid constituents | 800–1,200 |
| Meat extract with 55% solid constituents | 400–500 |
| 20% sodium alginate solution | 150–250 |
| Yeast with 22% solid constituents | 600–700 |
| Blood plasma | 300–500 |
| Margarine | 200–300 |

The drying gas which is used in accordance with the invention is brought and maintained by pretreatment, a predrying, at a humidity not exceeding about 10 percent preferably about 8 percent. When the temperature of the inlet gases is maintained at about 35° C., the relative humidity of the dehumidified gas is at about 3 percent to 4 percent.

Consequently, the stream of gas is substantially predehumidified, for example, by freezing out the moisture or passing the gas over substances which remove the moisture content in the gas. Such dehumidifying materials include, for example, alumina gel, silica gel, dry calcium sulfate, dry magnesium sulfate, and the like. The process of the invention provides and allows for a treating temperature in the drying tower which is commensurate with the temperature at which the material was exposed in nature so that the drying material need not be exposed to a temperature in the drying tower which exceeds that at which the material is sensitive. The inlet feed temperature at which such materials may be introduced into the drying tower can reach up to about 60° C. for such heat sensitive materials. The material is substantially immediately cooled upon being fed into the drying tower. For materials which are less heat sensitive a treating temperature in the tower up to about 60° C. is suitable. The process of the invention may also be carried out up to about a temperature of about 80° C. since the temperature of the material itself is substantially below the temperature of the drying gas, particularly when the material is still damp, and particularly when the material is to be dried to a residual humidity of about 10 to 15 percent. The product will ordinarily contain 1 percent to 15 percent residual moisture. If desired, the material may then be subjected to a postdrying treatment. For most materials a preferred range of the temperature of the drying gas is between about 5° C. and about 35° C. For fat-containing milk products that are especially heat sensitive, it is advisable to operate at temperatures between 0° C. and 18° C. For these products temperatures exceeding 30° C. should preferably not be employed.

The contact period between the drying gas and the droplets must be correspondingly long. It is, therefore, a further characteristic feature of the present invention to operate in countercurrent fashion and to provide rather relatively prolonged contact periods of gas and products. In other words, the stream of drying gas travels at relatively low velocities against the oppositely moving material for relatively long distances.

During the dehydration the water is evaporated mainly from the surface of the material being dried rather than from its interior. Moreover, dehydration proceeds gradually. With droplet sizes between about 100 microns and about 1,500 microns, the average contact period between dehydrating gas and droplets is between about 5 seconds and 1,000 seconds, in contrast to a fraction of a second used in conventional spray drying.

The velocity of the gas stream in accordance with the present invention is preferably between 0.05 meters/second and about 0.3 meters/second, but may range between 0.01 meter and 1 meter in a tower of a height as here involved where a total contact time of the order above indicated is obtained. The speed of the air and the height of the fall are both relative and correlated by the increase in humidity of rising column of air to the high degree specified. Thus, with a relatively short tower, the air velocity is increased in order to float the falling material longer so that the air achieves the degree of humidity specified—this in contrast to a higher tower were the time of a fall is longer and a lesser upward velocity is required. The low velocity of the upwardly moving gas together with the presence of a zone of high humidity results in that in the upper half of the tower there is essentially no dust of the treated material. The effluent gases are essentially aroma free even in the case of very aromatic products.

The particle size and the speed of the predried gas current can be adjusted in accordance with the desired purpose in such a manner that an advantageous dehydrating time is achieved, for instance, a dehydrating time between 10 seconds and 120 seconds.

The gradual diminution of the humidity content of the air and gas stream, from an almost completely saturated state at the top of the tower, to a nearly completely dry state at the bottom of the tower where the air is introduced, permits a perfectly directed, regulated and slow evaporation. Thus, in accordance with the process of the invention, dehydration of the substance is initiated gradually at the top of the tower where the substance is in the liquid phase and water elimination is infinitely easier than later in the process when the substance is in the concentrated or solid phases. In the latter phase of the present process, even with the extremely dry air which is fed into the bottom of the tower, there is no danger of fast evaporation since the water elimination from the particle tends to become more and more difficult as its water content decreases. (This is in accordance with the well-known "Trockenschwanz" phenomena.) On the other hand, in the top of the tower where water may be eliminated very easily, the relatively high saturation of the air in proportion to the overall physical conditions of the substance prevents and minimizes an excessively fast elimination of water.

The long, controlled, directed evaporation of the process of the invention is one of the main points of the process. It minimizes any sudden change of climate in any increment of vertical travel of the droplets. This is possible due to the special height of the tower with a potential humidity scale calculated in proportion to the height of the tower.

In order to achieve a high humidity saturated atmosphere in the upper portion of the drying tower it is highly desirable that the tower height be maintained at a minimum of about 40 to 50 meters. The height of the tower is preferably considerably higher, for instance, between 50 and 200 meters, to avoid any sudden change of climate in any increment of vertical travel of the droplets.

In general, air is used as the drying medium unless the material is sensitive to oxygen, in which case an inert gas, such as carbon dioxide or nitrogen, may be used.

According to a further important feature of the present invention the countercurrent stream of air or other drying gas is maintained in contact with the product until it approaches a high degree of humidity, above 65 percent, and preferably between 75 percent and 95 percent of saturation at the level of introduction of the droplets within the tower. These conditions are secured in a tower of adequate height, with the liquid being dispersed into drops near the top, and dry air or gas entering at the bottom. The height of the tower, the upward velocity of the drying gas, and the size of the drops are such that when the air or gas reaches the level in the tower where the drops are entering, it will be highly humid, that is, above 65 percent relative humidity. With this combination of conditions there is a minimum of evaporation at the level where the drops enter the countercurrent stream of air or drying gas; no temperature conducive to the release of low volatile aromatics and flavor from the substance is encountered, and there is no heat to damage the product. On the contrary, the liquid droplets will reabsorb from the highly humid atmosphere aromas and flavor that may have been yielded to the gas in the lower portion of the tower and also absorb dried dustlike particles of the product that may have been carried up with the rising column of gas. These two zones and their respective functions as described are an important feature of the process. The air or gas is withdrawn above the level at which the liquid enters the tower.

During the process, as the drops move downwardly against the rising column of gas they progressively encounter drier and drier air or gas and evaporation takes place progressively and gradually. Evaporation may be continued until only solids remain, or it may be effected only to the extent necessary to produce a product of a slurry or pastelike character or a thick viscous concentrate, depending, of course, upon the material being treated and the product to be formed. The dried product will ordinarily contain from 1 to 15 percent of moisture.

The product obtained in the process is collected at the bottom of the tower which may be flat or funnel-shaped. In another embodiment, the bottom of the tower consists of an intermediate flat bottom, which is inserted at a distance of about 0.5 meters to 0.6 meters from the actual bottom of the tower, through which the air can flow upwardly while the dehydrated product is retained on the intermediate bottom and is removed from the tower by means of customary devices, such as scrapers and a screw conveyor. The intermediate bottom may consist of a ceramic mass, for example of porous plates. It may also take the form of a filter material deposited upon such plates, or a freely suspended filter cloth under tension which is supported by a metal mesh or a net. Below the intermediate bottom a gas pressure chamber may be provided, so that the gas can be forced through the intermediate bottom under pressure. Thus, the collection means of the tower used for the process is adapted to suit best the particular operating conditions and the product obtained.

The invention is further illustrated by the accompanying drawing, FIG. 1 of which is a sectional elevation view of a drying zone in which the invention may be carried out. In FIG. 1 there is shown a drying tower 1 with a false bottom 2 which is a horizontal porous, sievelike support. The false bottom 2 defines a space 3 with the tower bottom and an inlet pipe 4 supplies a gaseous drying medium to the tower. The liquid material to be dried in the tower is introduced therein through supply conduit 5 leading to a material distribution system 6 having a plurality of inlets for producing a dense curtain of droplets over almost the entire horizontal cross section of the tower. The used drying medium, or gas, which carries the water from the liquid material dried in the tower, is led into the atmosphere through flue 7 or it may be recovered through gas outlets 8 and 7 leading to a gas dehumidifying plant. The drying medium may be returned to the drying tower in a closed cycle after it has been dehumidified.

The granular powder is collected on the false bottom until it has reached a desired layer thickness and after it has reached a predetermined degree of dehydration, a scraper 9, which is rotatable about the axis of the tower, is turned to push the dried material through a radial slot arranged in the false bottom above screw conveyor 10. The screw conveyor is mounted in a housing which has an upper opening facing the radial slot so that the dried material can fall through the slot into the housing and be transported out of the housing and the tower by the screw conveyor directly into a vacuum packing device 11 without contacting the atmosphere. If the scraper 9 has brushes for pushing the dried material it may be useful intermittently to blow a dried gas through inlet pipes 12 to remove material adhering to the brush bristles.

FIG. 2 shows another sectional elevation view of another embodiment of the drying tower 1, with a top 14 and a bottom 15 with a porous intermediate bottom 16 disposed at a space above bottom 15. The inlet opening provides fresh gas into the interspace between the drying bottom and the porous intermediate bottom 16. The air outlet 18 is directed through the top 14 and another intermediate top 19 spaced apart from said top. This intermediate top 19 carries the material distributor devices 20 and also sidewalls 21 by means of which, for instance, a frame 22 which may be welded together from steel pipes is adjustable down to the porous intermediate bottom 16 in the drier. Thus, the height of the effective drying zone is adjustable relative to the other variables of the process such as velocity of the rising gas. Frame 22 is covered with a filter 23 and is adapted outside with brushes 24 to brush the tower walls. Through the covered porous intermediate bottom 16 on which the layer of material 25 is accumulated, an overflow pipe 26 which is height adjustable, is projected through which the powder can trickle into fluidized bed afterdriers 27 which are arranged in se stepwise series upon another. Into these afterdriers, fresh drying gas can be introduced through inlet 29 into the space below the driers through the bottom inlets 28, in adjustable amounts. The exhaust gas of the afterdrier can then be fed back to the tower through the pipes 30 disposed in variable heights through the tower wall. Traces of dried material carried off with the afterdrier exhaust gas from the tower may thus be recovered, and the moist air has the further opportunity to yield any aromatic and flavor substances or volatiles to the liquid.

Figure 3:
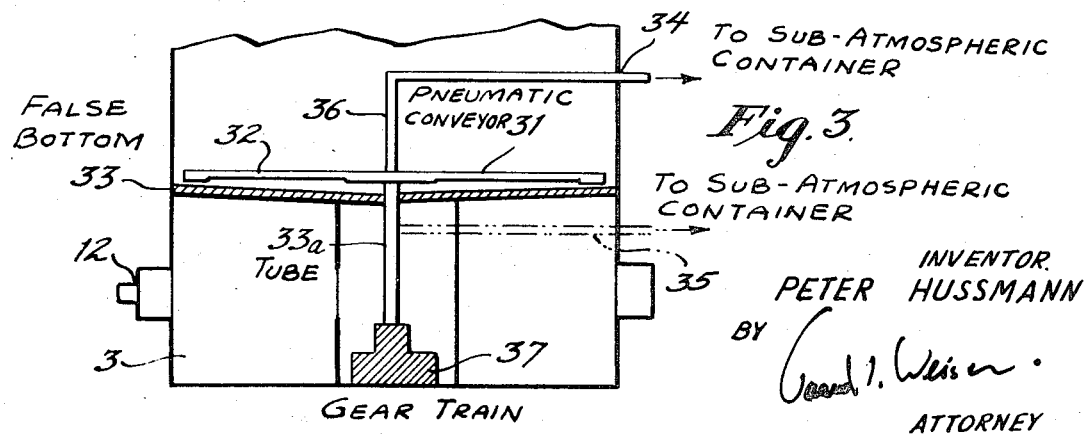

FIG. 3 shows a modified bottom in a drying tower of the type shown in FIGS. 1 and 2. In this embodiment, the dried material is not removed from the false bottom by a mechanical scraper but by a pipe 31 acting as a pneumatic conveyor. The pneumatic conveyor comprises a radially extending pipe 32 arranged for rotation about the axis of the tower to sweep over false bottom 33 with a suction slot facing the false bottom. The radially extending pipe 32 is in communication with an axially extending tube 33a is in communication with an axially extending tube 33a whose output is connected to the interior of a container which is under subatmospheric pressure, by means of conduits 34 or 35. The tube 36 is rotated through a gear train 37 by a power source (not shown) and suitable gaskets are arranged at all joints between movable and fixed parts, as will be obvious to the skilled in the art without further explanation or illustration. If desired, the mechanical and pneumatic conveyors shown in FIGS. 1 and 3 may be so combined that the mechanical scraper pushes the dried material towards the circumference of the tower while the pneumatic conveyor has suction slots only at the outer end or ends of the radial pipe 32 to pick up the powder at the tower circumference and transport it pneumatically to the packing station.

FIG. 4 shows another embodiment of a drying tower bottom. In this embodiment two spaced and superposed sievelike false bottoms are arranged in the tower. Each of the false bottoms is constituted by a plurality of sector-shaped sieve boxes 38. FIG. 5 is an enlarged fragmentary vertical sectional view of a sieve box and related parts as shown in FIG. 4; and FIG. 6 is a sectional view of a detail, namely the means to affect rotation of the sieve box. FIG. 7 is a horizontal section taken on the line 7–7 of FIG. 6. As is shown in FIGS. 5 and 6, the spacing between adjacent sieve boxes is sufficient to enable all boxes to be turned by 180° simultaneously, a single motor turning the gear rod which meshes with pinions on the individual bearing pins of the sieve boxes. The sieve boxes have bearing pins 38a and 38b at their respective ends and the bearing pins define an axis about which the boxes may be rotated. The bearing pins are supported in gear box 45 while pins 38a are journaled in the tower wall. The gear boxes 45 for each of the false bottoms are mounted on the support pipe 46 extending axially into the drying tower, and radially extending brush support rods 47 are mounted on the pipe and may be moved along the pipe to adjust the spacing of the brushes 48 in relation to the underside of the false bottoms. The brushes 48 are rotatable about their axes by motors 49 and sweep the undersides of the sieve boxes. In this manner, the dried spherical granules fall first on the upper false bottom, pass through its sieve boxes, are swept off their undersides, fall on the underlying false bottom, pass through the latter's sieve boxes, are swept off their undersides and drop to the bottom of the tower where they are swept by a rotating scraper or brush 50 into a central outlet opening through which the dried powder falls by gravity into packing station 51 without contacting the atmosphere. The dehumidified drying gas may be introduced into the bottom of the drying tower through pipe 46 and a baffle plate 52 may be mounted over the outlet of the pipe to distribute the drying gas over the entire cross section of the tower so that it will rise from the bottom in a column. The introduction of drying gas is preferably initiated only shortly after the sieve boxes have been turned so that the fine-mesh sheet 53 is fully dried before another layer of dried material is formed thereon. As shown in FIGS. 5 and 6, the sieve boxes 38 are bounded by two generally horizontally extending perforated or sievelike walls 53 and one of these walls has placed thereover a fine-mesh web 54. The sieve boxes may be turned about their horizontal axes. The bearing pins 38a of two sieve boxes of each false bottom project outwardly from the tower wall and carry motors 39 enabling the boxes to be turned by 180°. The inner pins 38b of adjacent boxes project alternatively into an inner and an outer annular chamber in gearbox 45 and carry respective pinions 42 and 43 meshing respectively with annular gears 44 and 44a which are rotatable about the axially extending support pipe 46. In this manner, adjacent sieve boxes are rotated about their axes sequentially one after the other. This prevents interference of neighboring sieve boxes with other during rotation and makes it possible to space adjacent boxes more closely together so that the interspaces may be fully covered by the sieve sheets if the latter extend only a little laterally beyond the boxes. When a motor 39 turns one sieve box, the respective pinion 42 or 43 on the inner bearing pin of the box is simultaneously rotated and moves forward the rotational mounted annular gear 44 or 44a for a given distance. This rotational movement, in turn, causes rotation of the adjacent pinions 42 and 43 so that the alternate sieve boxes are sequentially turned by 180°.

When the drying tower is a circumferential cross section, as shown in FIG. 4, the sieve boxes are sectionally divided. When the drying tower is of a horizontally rectangular cross section, the perforated bottoms are made of rectangular sieve boxes arranged adjacently to each other, as shown in FIG. 5. Beneath the sieve boxes there can be disposed brushes 55 which are movable on a rail 56 and which serve for brushing the under surfaces of the sieve boxes.

The following examples serve to illustrate the present invention without, however, limiting the same thereto.

EXAMPLE

There were transformed 1,100 kg. of orange juice into a powder having a residual moisture content of 12 percent. Preliminary experiment had indicated that droplets of 500 microns were most advantageous. The orange juice was divided into such droplets with the aid of pressure nozzles arranged below the top of the drying tower. Three large-size nozzles each having a capacity of 365 kg. per hour were used, the combination being capable of handling 1,100 kg. per hour. In place of three large nozzles, 11 smaller nozzles, each of 100 kg. per hour capacity could have been used. The most effective dehydrating period was determined to be 70 seconds in a tower 50 meters high with a rate of descent of 0.65 meters per second, and with the nozzles 4.5 meters from the top of the tower. Because of its high fructose and glucose sugar content, orange juice is very hygroscopic. The temperature of the drying air entering the tower was 20° C. The air leaving the top of the tower contained 10 percent of water per cubic meter, this being close to 85 percent saturation taking into consideration the temperature drop caused by evaporation. For evaporating about 1,000 kg. of water from 1,100 kg. of orange juice, a total of 100,000 cubic meters of air were required.

The cross-sectional area of the tower was about 195 sq. meters, and its diameter was 15.75 meters. The drying air was introduced tangentially at the bottom of the tower with the aid of fans through a circular feed line. The tangential air feed slits had a total discharge area of 30 sq. meters to 60 sq. meters. In this manner about 115 kg. of dehydrated orange juice having a moisture content of about 7 percent were recovered at the bottom of the tower, using a revolving scraper and screw conveyor.

EXAMPLE 2

There are treated 1,000 kg. of cream of a fat content of 55 percent yielding fine droplets of a particle size of about 200 microns with the aid of pressure nozzles. Three large-size pressure nozzles, each having a capacity of 335 kg. per hour, are used. The rate of descent of the droplets of sprayed cream is about 0.65 meter per second. Thus, the droplets are in contact with the dehydrating air current for about 70 seconds in a dehydrating tower of a height of 50 meters. The temperature of the dehydrating air current is about 15° C. Before entering the dehydrating tower, the air is carefully dried. The predried air is introduced into and conducted in the tower in countercurrent direction to the cream droplets. Dehydrated cream is collected at the bottom of the tower in powder form. On kneading and intimately mixing the powder with about 10 percent of water and allowing the mixture to stand for a few minutes, a spreadable butterlike cream is obtained which fully corresponds in its consistency, odor, and taste to ordinary butter. The powder can be stored without refrigeration for at least several months without becoming rancid.

In place of the concentrated cream, there can also be used cream of a lower fat content, for instance, of a fat content of 18 percent. This starting material yields a dehydrated cream powder which can readily be reconstituted by means of water to cream of the original fat content and which can be stored for several months without damage. 30

EXAMPLE 3

The procedure is about the same as described in example 1 whereby, however, pasteurized whole milk is dehydrated in place of orange juice. The droplet size range is between about 500 microns and about 700 microns. The outflow speed of the milk from the nozzles is about 3 meters per second. The average speed of descent of the droplets is about 0.70 meters per second. The temperature of the predried air introduced into the bottom of the tower is about 24° C. The air leaving the top of the tower has a moisture content of about 85 percent relative humidity and a temperature of about 14° C. For evaporating about 1,000 kg. of water from about 1,100 kg. of whole milk per hour, a total of about 100,000 cubic meters of air are required. The resulting milk powder of a water content of about 3 percent is readily soluble and reconstitutable in water and the reconstituted milk has substantially the same aroma and flavor as the starting milk.

Other dehydrated materials can be obtained by dividing the materials described in the table, above, into droplets of the average particle size range stated, and subjecting the droplets to a dehydration in which the rate of descent varies between about 0.40 meters per second and about 1 meter per second. The temperature of the drying gas introduced into the drying tower is between about 22° C. and about 28° C. The air volume to evaporate about 1,000 kg. of water from the materials to be dried is about the same as that used in example 1.

There are fed 1,100 kg. of a solution of gelatin coming from extraction (8 percent solids) at the top of the tower in a droplet size of 300 microns and in the form of a dense screen. The velocity of descent is approximately 1.4 m. per second. Air requirements are approximately 100,000 m³. At an entrance temperature of 24° C., approximately 95 kg. will arrive at the bottom of the tower with a residual moisture content of 8 percent. The exit temperature of the gas stream at the top of the tower is about 14° C. due to the evaporation.

The air saturation is 85 percent. The product obtained is a fine, porous grain dissolving 5 times faster in water than sheet gelatin or pulverized gelatin Moreover, the solubility rate of this gelatin is 5 percent higher than that of gelatin produced with the vacuum evaporator and normal drying. Also, it has a 20 percent higher gelling power and a solubility rate 10 times faster than the gelatin produced by spray drying.

The process according to this invention is applicable to liquid-carrying solids, in solution or suspension, especially organic materials. It is also suitable for the preparation of stable preparations of edible fats, especially of butter, milk fat, and margarine and other lacteal products. Thus, it is possible to convert milk, cream, or whey, regardless of whether sweet whey or acid whey is employed, and if desired, with the addition of bacterial cultures, water, and sodium chloride, into a condition wherein the edible product can be stored for a prolonged period of time and, if made from a milk substance containing sufficient fat, it will produce a kneadable product which may be used as a spread for bread.

The new process is applicable to cream of a fat content, for instance, between 40 percent and 60 percent. Such a concentrated cream has a low milk sugar content which does not affect the taste of the resulting cream. Of course, when washing and centrifuging cream with water prior to dehydration, its milk sugar content can also be considerably reduced. The resulting cream has a fat content between 82 percent and 87 percent and a total dry content of 97 percent to 99 percent and as a maximum, of 99.5 percent. Such a dehydrated cream, after reconstitution with about 10 percent to 12 percent of water, has a fat content which is only slightly or not at all lower than the butter fat content of ordinary butter which is between 80 percent and 82 percent.

Such a butterlike cream has the very important advantage that a large proportion of the mineral salts and of other mild constituents which ordinarily are removed together with the buttermilk and which comprise about 3.5 percent of milk proteins, 0.7 percent of mineral substances, and 4 percent of milk sugar, remain in the cream. This is of considerable nutritional value. In addition thereto the process according to the present invention has the economical advantage that substantially no fatty material is lose. Heretofore, about 0.2 percent to 0.5 percent of fat were lost in the butter milk. It is evident that this process eliminates completely the problem of finding a proper use for buttermilk. Dehydrated butter powder and butter fats dehydrated according to the present invention have the further advantage that they do not sputter on heating.

As mentioned above, the milk sugar may be eliminated before dehydration by adding to the cream to be dehydrated, which contains for instance 30—60 percent of fat, 4 times to 10 times its amount of distilled or tap water, intimately mixing the cream therewith, and centrifuging the resulting dilute cream at room temperature or at elevated temperature. This washing process may be repeated for a second time, if desired. When completely washing out the milk sugar, the resulting dehydrated product represents a butterlike mass. When washing cream, various types of butterlike products can be obtained in dehydrated form. All these butterlike preparations can readily be reconstituted to butter by mixing and kneading with 15—20 percent of water.

Cooked products such as mashed potatoes, purees of cooked vegetables or fruits, jams or jellies or infusions, such as coffee are preferably cooled before being dehydrated so that their temperature is close to the temperature of the humid evaporating medium, air or gas, into which they are introduced so as to avoid the release of substantial heat in the upper portion of the tower and a corresponding decrease in the relative humidity of the atmosphere at this level. On the other hand, if the product were cooler than the atmosphere in which drops were formed, condensation of moisture in this area, unlike conventional processes where a cold product is introduced into a heated gas, is not detrimental since it may favor the absorption from the gas of volatiles released at lower levels and is compatible with the gradual drying of the drops below the level of its formation.

The advantageous properties of the products of the invention are illustrated by tests and analyses which have shown, for instance, that the total acidity of dehydrated citrus fruit juices, and their vitamin A and vitamin C content are not appreciably reduced by dehydration. In dehydrated tomato powder the acidity and vitamin C as well as the pigments lycopene and carotene (provitamin A) were not substantially affected. Dehydrated mashed potatoes with 30 percent of milk showed under the microscope the characteristic unchanged potato starch grains. The proteins, fats, and carbohydrates present therein were substantially unchanged. Dehydrated milk powder according to the present invention contains the $\alpha$-lactose in unchanged form while in conventional spray drying the $\alpha$-lactose is converted into $\beta$-lactose. The egg albumin, phosphatides (lecithin), fats, and provitamin A in dehydrated egg powder obtained according to the present invention were not affected by the dehydration process. Dehydrated yeast contained the same amount of vitamin $B_1$ as the starting yeast. The process is applicable to heat-sensitive pharmaceutical solutions or suspensions.

In order to promote a powder product with a constant homogeneous granular size, it is advisable to reintroduce the exhaust gases of the afterdrying device which still contain dust particles of the material. It was found that the dust particles of the material melt together with the droplets or particles falling down from the top, if introduction takes place in an appropriate tower altitude, preferably in the region between the lower and the upper quarter between the bottom of the tower and the spraying device.

If several afterdrying devices are used sequentially the exhaust gas of each afterdrying device containing dust particles of the material is reintroduced to the tower through separate pipes and if necessary at different tower altitudes. The afterdrying devices may be arrange arranged directly one upon another or laterally following one another.

Of course, it will readily be apparent to those skilled in the art that the invention is not limited to the above-described particular embodiments, and that various changes and modifications may be made without departing from the spirit of the invention or the scope of the appended claims.

I claim:

1. A high drying tower for converting a wet material into a substantially dry powder comprising top and bottom walls connected by a circumferential wall, spray means adjacent and beneath said top wall to deliver the liquid material into the tower for descent towards said bottom wall, a horizontally extending false porous bottom in said tower above said bottom wall, inlet means for admission of dehumidifying dry gas in the space between said porous false bottom and said bottom wall so that the gas passes vertically upwardly through said porous false bottom and in the tower countercurrent to the descent of said wet material, outlet means in said top wall for venting the moisture-laden gas, and means to remove the dried powder on said false bottom from beneath the latter, said powder removal means including a plurality of cascadingly intercommunicating fluidized bed afterdriers arranged in descending stepwise manner beneath said porous false bottom, said false bottom including an overflow pipe discharging into the uppermost afterdrier, said afterdriers including bottom inlets for the passage upwardly therethrough of dehumidifying dry gas.

2. The combination of claim 1 and conduits connecting each afterdrier with the interior of said tower above said porous false bottom for conducting the dry air passing through each afterdrier into the tower.

3. The combination of claim 1 wherein said spray means includes a frame mounting a filter member opening towards the interior of the tower.

4. The combination of claim 1 wherein said spray means includes a frame mounting radially extending brushes contacting said circumferential wall of the tower to sweep the same.

5. A high drying tower for converting a wet material into a substantially dry powder comprising top and bottom walls connected by a circumferential wall, spray means adjacent and beneath said top wall to deliver the liquid material into the tower for descent towards said bottom wall, a horizontally extending false porous bottom in said tower above said bottom wall, inlet means for admission of dehumidifying dry gas in the space between said porous false bottom and said bottom wall so that the gas passes vertically upwardly through said porous false bottom and in the tower countercurrent to the descent of said wet material, outlet means in said top wall for venting the moisture laden gas, and means to remove the dried powder on said false bottom from beneath the latter, said porous false bottom including a plurality of radially extending sieve boxes, means mounting said sieve boxes for rotation in unison axially of the tower, said powder removal means including brushes rotatably mounted beneath said sieve boxes to sweep their undersides and motor means to drive said sieve boxes separately from said brushes.